(12) United States Patent
Nelson et al.

(10) Patent No.: US 8,499,003 B2
(45) Date of Patent: *Jul. 30, 2013

(54) AGGREGATE CONTRIBUTION OF ICEBERG QUERIES

(75) Inventors: Jelani Osei Nelson, St. Thomas (VG); David P. Woodruff, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,864

(22) Filed: Aug. 1, 2012

(65) Prior Publication Data

US 2012/0296935 A1    Nov. 22, 2012

Related U.S. Application Data

(63) Continuation of application No. 13/032,013, filed on Feb. 22, 2011.

(51) Int. Cl.
*G06F 7/00* (2006.01)
*G06F 17/30* (2006.01)

(52) U.S. Cl.
USPC .......................................... 707/769

(58) Field of Classification Search
USPC .......................................... 707/999.002, 769
See application file for complete search history.

(56) References Cited

U.S. PATENT DOCUMENTS

| | | | |
|---|---|---|---|
| 6,152,563 A * | 11/2000 | Hutchinson et al. | 351/209 |
| 6,173,415 B1 * | 1/2001 | Litwin et al. | 714/5.1 |
| 7,158,961 B1 * | 1/2007 | Charikar | 1/1 |
| 7,437,385 B1 | 10/2008 | Duffield et al. | |
| 7,590,657 B1 | 9/2009 | Cormode et al. | |
| 7,751,325 B2 | 7/2010 | Krishnamurthy et al. | |
| 7,756,805 B2 | 7/2010 | Cormode et al. | |
| 7,779,143 B2 | 8/2010 | Bu et al. | |
| 2005/0111555 A1 * | 5/2005 | Seo | 375/240.17 |
| 2008/0225740 A1 | 9/2008 | Martin et al. | |
| 2009/0031175 A1 | 1/2009 | Aggarwal et al. | |
| 2009/0046581 A1 | 2/2009 | Eswaran et al. | |
| 2009/0172059 A1 | 7/2009 | Cormode et al. | |
| 2009/0292726 A1 | 11/2009 | Cormode et al. | |
| 2010/0049700 A1 | 2/2010 | Dimitropoulos et al. | |

OTHER PUBLICATIONS

Aggarwal, C., et al., "On the Surprising Behavior of Distance Metrics in High Dimensional Spaces," in ICDT, pp. 420-434, 2001.

Beyer, K.S., et al., "Bottomup Computation of Sparse and Iceberg Cubes," in SIGMOD Conference, pp. 359-370, 1999.

(Continued)

*Primary Examiner* — Shyue Jiunn Hwa
*Assistant Examiner* — Muluemebet Gurmu
(74) *Attorney, Agent, or Firm* — Fleit Gibbons Gutman Bongini & Bianco PL; Thomas Grzesik

(57) ABSTRACT

One or more embodiments determine a distance between at least two vectors of n coordinates. A set of heavy coordinates is identified from a set of n coordinates associated with at least two vectors. A set of light coordinates is identified from the set of n coordinates associated with the at least two vectors. A first estimation of a contribution is determined from the set of heavy coordinates to a rectilinear distance between the at least two vectors. A second estimation of a contribution is determined from the set of light coordinates to the rectilinear distance norm. The first estimation is combined with the second estimation.

7 Claims, 15 Drawing Sheets

OTHER PUBLICATIONS

Cand'es, E.J., et al., "Stable Signal Recovery From Incomplete and Inaccurate Measurements," Communications on Pure and Applied Mathematics, 59(8), 2006.

Chaudhuri, S., et al., "On Random Sampling Over Joins," In SIGMOD Conference, pp. 263-274, 1999.

Cisco NetFlow. http://www.cisco.com/go/netflow.

Clarkson, K.L., "Subgradient and Sampling Algorithms for 11 Regression," In Proceedings of the 16th Annual ACM-SIAM Symposium on Discrete Algorithms (SODA), 2005.

Cohen, E., et al., "Algorithms and Estimators for Accurate Summarization of Internet Traffic," In Internet Measurement Conference, pp. 265-278, 2007.

Cormode, G., et al., "Comparing Data Streams Using Hamming Norms (how to zero in)," IEEE Trans. Knowl. Data Eng., 15(3): 529-540, 2003.

Cormode, G., et al., "Sketching Streams Through the Net: Distributed Approximate Query Tracking," In VLDB, pp. 13-24, 2005.

Cormode, G., et al., "Space and Time Efficient Deterministic Algorithms for Biased Quantiles Over Data Streams," In PODS, pp. 263-272, 2006.

Cormode, G., et al., "Time Decaying Aggregates in Out-of-Order Streams," In PODS, pp. 89-98, 2008.

Cormode, G., et al., "An Improved Data Stream Summary: The Countmin Sketch and Its Applications," J. Algorithms, 55(1):58-75, 2005.

Cormode, G., et al., "Space Efficient Mining of Multigraph Streams," In Proceedings of the 24th ACM SIGACT-SIGMOD-SIGART Symposium on Principles of Database Systems (PODS), pp. 271-282, 2005.

Cormode, G., et al., "What's Hot and What's Not: Tracking Most Frequent Items Dynamically," ACM Trans. Database Syst., 30(1):249-278, 2005.

Dodge, Y., "L1-Statistical Procedures and Related Topics," Institute for Mathematical Statistics, 1997.

Fang, M., et al., "Computing Iceberg Queries Efficiently," In VLDB, pp. 299-310, 1998.

Feigenbaum, J., et al., "An Approximate L1 Difference Algorithm for Massive Data Streams," SIAM J. Comput., 32(1): 1310323, 2006.

Gilbert, A.C., et al., "One Sketch for all: Fast Algorithms for Compressed Sensing," In STOC, pp. 237-246, 2007.

Indyk, P., "Stable Distributions, Pseudo-Random Generators, Embeddings, and Data Stream Computation," J. ACM, 53(3): 307-323, 2006.

Jayram, T.S., et al., "The Data Stream Space Complexity of Cascaded Norms," In Proceedings of the 50th Annual IEEE Symposium on Foundations of Computer Science (FOCS), 2009.

Kane, D.M., et al., "On the Exact Space Complexity of Sketching Small Norms," In Proceedings of the 21st Annual ACM-SIAM Symposium on Discrete Algorithms (SODA), to appear, 2010.

Labib, K., et al., "A Hardware Based Clustering Approach for Anomaly Detection," 2006.

Lau, W.C., et al., "Datalite: A Distributed Architecture for Traffic Analysis Via Lightweight Traffic Digest," In BROADNETS, pp. 622-630, 2007.

Lopuhaa, H.P., et al., "Breakdown Points of Affine Equivalent Estimators of Multivarite Location and Co-Variance Matrices," Annals of Statistics, 19(1):229-248, 1991.

Nelson, J., et al., "A Near Optimal Algorithm for L1 Difference," CoRR, abs/0904.2027, 2009.

Nie, J., et al., "Semi-Definite Representation of the Kellipse," Algorithms in Algebraic Geometry, IMA Volumes in Mathematics and its Applications, 146:117-132, 2008.

Nisan, N., "Pseudorandom Generators for Space Bounded Computation," Combinatorica, 12(4):449-461, 1992.

"Open Problems in Data Streams and Related Topics", IITK Workshop on Algorithms for Data Streams, 2006. http:www.cse,iitk.ac.in/users,sganguly.data-stream-probs.pdf.

Pagh, A., et al., "Uniform Hashing in Constant Time and Linear Space," SIAM J. Comput., 38(1):85-96, 2008.

Schweller, R.T., Reversible Sketches: Enabling Monitoring and Analysis Over High Speed Data Streams, IEEE/ACT Trans. Netw., 15(5): 1059-1072, 2007.

Thorup, M., et al., "Tabulation Based for Universal Hashing with Applications to Second Moment Estimation," In Proceedings of the 15th Annual SCM-SIAM Symposium on Discrete Algorithms (SODA), pp. 615-624, 2004.

Vadhan, S.P., Pseudorandomness II. Manuscript. http://people.seas.harvard.edu/salil/cs225/spring09/lecnotes/FnTTCS-vol2.pdf.

Yi, B., et al., "Fast Time Sequence Indexing for Arbitrary Ip Norms," In VLDB, pp. 385-394, 2000.

Indyk, P., et al., "Declaring Independence Via the Sketching of Sketches," In SODA pp. 737-745, 2008.

Berinde, R., et al., "Space-Optimal Heavy Hitters with Strong Error Bounds," PODS'09, Jun. 29-Jul. 2, 2009, Providence, Rhode Island; Copyright 2009, ACM 978-1-60558-553-Jun. 9, 2006.

Cormode, G., et al., "Finding Hierarchical Heavy Hitters in Streaming Data," Copyright 2007, ACM 0362-5915/2007/0300-0001.

Jayram, T.S., et al., "The Data Stream Space Complexity of Cascaded Norms," 2009n $50^{th}$ Annual IEEE Symposium on Foundations of Computer Science, 0272-5428/09; copyright 2009 IEEE; DOI 10.1109/FOCS.2009.82.

Zhu, Z., et al., "Finding Heavy Hitters by Packet Count Flow Sampling," 2008 International Conference on Computer and Electrical Engineering, 978-0/7695-3504-3/08 copyright 2008 IEEE; DOI 10.1109/ICCEE.2008.90.

Lahiri, B., et al., "Finding Correlated Heavy-Hitters Over Data Streams," 978-1.4244-5736-6/09 copyright 2009 IEEE.

Zhang, N., et al., "Identifying Heavy-Hitter Flows Fast and Accurately," copyright 2010 IEEE, 978-1.4244-5824-0.

Woodruff, D.P., et al., "Fast Manhattan Sketches in Data Streams," to be copyrighted Jun. 2011.

Non-Final Office action received for U.S. Appl. No. 13/032,013 dated Nov. 26, 2012.

* cited by examiner $$\mathrm{Var}[\Phi \mid \mathcal{E}] = -\|\mathcal{X}_{\text{head}}\|_1^2$$
$$+ \sum_{w,y \in L} \mathrm{E}[\mathrm{sign}(x_w)\mathrm{sign}(x_y)\sigma^{i(w)}(w)\sigma^{i(y)}(y)$$
$$\times D_{i(w),j(w)} D_{i(y),j(y)} \mid \mathcal{E}]$$
$$= -\|\mathcal{X}_{\text{head}}\|_1^2 + \sum_{w \in L} \mathrm{E}[D_{i(w),j(w)}^2 \mid \mathcal{E}]$$
$$+ \sum_{w \neq y \in L} \mathrm{E}[\mathrm{sign}(x_w)\mathrm{sign}(x_y)\sigma^{i(w)}(w)\sigma^{i(y)}(y)$$
$$\times D_{i(w),j(w)} D_{i(y),j(y)} \mid \mathcal{E}]$$

FIG. 2

$$E[D_{i,j}^2 | \mathcal{E}] = \sum_{y,y'} E[x_y x_{y'} \Gamma(y) \Gamma(y') \sigma^i(y) \sigma^i(y') | \mathcal{E}]$$

$$= \sum_{y} E[x_y^2 \cdot \Gamma(y) | \mathcal{E}]$$

$$= \sum_{y} x_y^2 \cdot \Pr[h^i(y) = j | \mathcal{E}],$$

FIG. 3

$$\Pr[\mathcal{F}^i_{L\cup\{y\}} \mid \mathcal{E}] = \frac{\Pr[\mathcal{E} \mid \mathcal{F}^i_{L\cup\{y\}}] \cdot \Pr[\mathcal{F}^i_{L\cup\{y\}}]}{\Pr[\mathcal{E}]}$$

$$= \frac{(\Pr[\mathcal{E}] - \Pr[\mathcal{E} \mid \neg \mathcal{F}^i_{L\cup\{y\}}] \cdot \Pr[\neg \mathcal{F}^i_{L\cup\{y\}}])}{\Pr[\mathcal{E}]}$$

$$\geq \frac{\Pr[\mathcal{E}] - \frac{1}{r}}{\Pr[\mathcal{E}]}$$

$$\geq 1 - \frac{10}{9r}$$

FIG. 4

$$E[\text{sign}(x_w)\text{sign}(x_y)\sigma^{i(w)}(w)\sigma^{i(y)}(y)\,D_{i(w),j(w)}D_{i(y),j(y)}\mid \mathcal{E}\,]$$

$$= E[\text{sign}(x_w)\sigma^{i(w)}D_{i(w),j(w)}\mid \mathcal{E}\,]$$

$$\times E[\text{sign}(x_y)\sigma^{i(y)}D_{i(y),j(y)}\mid \mathcal{E}\,]$$

$$= |x_w| \cdot |x_y|$$

FIG. 5

$$\text{Var}[\Phi \mid \mathcal{E}] \leq -\|\chi_{\text{head}}\|_1^2 + 2\varepsilon^2 \|x\|_1^2/9$$
$$+ \sum_{w \in L} x_w^2 + \sum_{w \neq y \in L} |x_w| \cdot |x_y|$$
$$= -\|\chi_{\text{head}}\|_1^2 + 2\varepsilon^2 \|x\|_1^2/9 + \left(\sum_{w \in L} |x_w|\right)^2$$
$$= -\|\chi_{\text{head}}\|_1^2 + 2\varepsilon^2 \|x\|_1^2/9 + \|\chi_{\text{head}}\|_1^2$$
$$= 2\varepsilon^2 \|x\|_1^2/9.$$

FIG. 6

1. Run an instantiation F of Filter, and HH of an $\ell_1$ heavy hitters algorithm with $\phi = \varepsilon^2, \gamma = \phi/2, \delta = 1/20$.
2. Initialize $3R = 3 \cdot (4/\varepsilon^2)$ counters $B_1[j], \ldots, B_R[j]$ to 0 for $j = 1, 2, 3$.
3. Pick a random hash function $h : [n] \to [R]$ as in Theorem 1 with $z = R$ and $c = 2$.
4. Select independent Cauchy random variables $A_1[j], \ldots, A_n[j]$ for $j = 1, 2, 3$.
5. Update($i, v$):  Feed update $(i, v)$ to both F and HH.
   $B_{h(i)}[j] \leftarrow B_{h(i)}[j] + A_i[j] \cdot v$ for $j = 1, 2, 3$.
6. Estimator:  Let $L$ be the list output by HH, and let $I = [R] \backslash h(L)$.
   Let $\Phi$ be the output of F, using the list $L$ from the previous step.
   Let $\tilde{L}_1(j) = \text{Est}_{GM}(B_j[1], B_j[2], B_j[3])$ as in Theorem 5.
   Output $\Phi + \frac{R}{|I|} \cdot \sum_{j \in I} \tilde{L}_1(j)$.

FIG. 7

$$E_{A,h}\left[\frac{R}{|I|} \cdot \sum_{j \in I} \tilde{L}_1(j)\right]$$

$$= E_{A,h}\left[\frac{R}{|I|} \cdot \sum_{j \in I} \tilde{L}_1(j) \mid \mathcal{F}_L\right] \cdot \Pr[\mathcal{F}_L]$$

$$+ E_{A,h}\left[\frac{R}{|I|} \cdot \sum_{j \in I} \tilde{L}_1(j) \mid \neg\mathcal{F}_L\right] \cdot \Pr[\neg\mathcal{F}_L]$$

$$= (1-\rho) E_{A,h}\left[\frac{R}{|I|} \cdot \sum_{j \in I} \tilde{L}_1(j) \mid \mathcal{F}_L\right]$$

$$+ \rho \cdot E_A\left[E_h\left[\frac{R}{|I|} \cdot \sum_{j \in I} \tilde{L}_1(j) \mid \neg\mathcal{F}_L\right]\right]$$

$$= (1-\rho) E_{A,h}\left[\frac{R}{|I|} \cdot \sum_{j \in I} \tilde{L}_1(j) \mid \mathcal{F}_L\right] \pm (\rho \cdot R) \|\chi_{\text{tail}}\|_1$$

$$E_{A,h}\left[\frac{R}{|I'|} \cdot \sum_{j \in I'} \tilde{L}_1(j) \,\Big|\, \mathcal{F}_L, \mathcal{E}_{I'}\right]$$

$$= \frac{R}{|I'|} \cdot \sum_{j \in I'} E_{A,h}\left[\tilde{L}_1(j) \,\Big|\, \mathcal{F}_L, \mathcal{E}_{I'}\right]$$

$$= \frac{R}{|I'|} \cdot \sum_{j \in I'} E_h\left[\sum_{i \notin L} 1_{h(i)=j} \cdot |x|_i \,\Big|\, \mathcal{F}_L, \mathcal{E}_{I'}\right]$$

$$= \frac{R}{|I'|} \cdot \sum_{j \in I'} \sum_{i \notin L} |x|_i \cdot \Pr_h\left[h(i) = j \,\big|\, \mathcal{F}_L, \mathcal{E}_{I'}\right]$$

$$= \frac{R}{|I'|} \cdot \sum_{j \in I'} \sum_{i \notin L} |x|_i \cdot \frac{\Pr_h[(h(i)=j) \wedge \mathcal{E}_{I'} \,|\, \mathcal{F}_L]}{\Pr[\mathcal{E}_{I'} \,|\, \mathcal{F}_L]}$$

$$\Pr_h[(h(i) = j) \wedge \mathcal{E}_{I'} \mid \mathcal{F}_L]$$
$$= \Pr_h[(h(i) = j) \wedge \mathcal{E}_{I'} \mid \mathcal{F}_{L \cup \{i\}}, \mathcal{F}_L] \cdot \Pr[\mathcal{F}_{L \cup \{i\}} \mid \mathcal{F}_L]$$
$$+ \Pr_h[(h(i) = j) \wedge \mathcal{E}_{I'} \mid \neg \mathcal{F}_{L \cup \{i\}}, \mathcal{F}_L] \cdot \Pr[\neg \mathcal{F}_{L \cup \{i\}} \mid \mathcal{F}_L]$$
$$= \Pr_h[h(i) = j \mid \mathcal{F}_{L \cup \{i\}}, \mathcal{F}_L] \cdot \Pr_h[\mathcal{E}_{I'} \mid \mathcal{F}_L, \mathcal{F}_{L \cup \{i\}}, h(i) = j]$$
$$\times \Pr[\mathcal{F}_{L \cup \{i\}} \mid \mathcal{F}_L]$$
$$+ \Pr[\neg \mathcal{F}_{L \cup \{i\}} \mid \mathcal{F}_L] \cdot \Pr[\mathcal{E}_{I'} \mid \mathcal{F}_L, \neg \mathcal{F}_{L \cup \{i\}}]$$
$$\times \Pr[h(i) = j \mid \neg \mathcal{F}_{L \cup \{i\}}, \mathcal{F}_L, \mathcal{E}_{I'}]$$

FIG. 10

$$E_h\left[\text{Var}_A\left[\sum_{j\in I}\tilde{L}_1(j)\right]\right] = E_h\left[\sum_{j=1}^{R} 1_{j\in I} \cdot \text{Var}_A[\tilde{L}_1(j)]\right]$$

$$= \sum_{j=1}^{R} E_h\left[1_{j\in I} \cdot \text{Var}_A\left[\tilde{L}_1(j)\right]\right]$$

$$\leq \sum_{j=1}^{R} E_h\left[\text{Var}_A\left[\tilde{L}_1(j)\right]\bigg|j\in I\right]$$

$$= \sum_{j=1}^{R} E_h\left[\frac{19}{8} \cdot \left(\sum_{i\notin L} 1_{h(i)=j} \cdot |x_i|\right)^2 \bigg| j\in I\right],$$

which equals $$\frac{19}{8} \cdot \left(\sum_{j=1}^{R} \sum_{i\notin L} |x_i|^2 \cdot \Pr{}_h[h(i)=j \mid j\in I]\right.$$

$$\left. + \sum_{j=1}^{R} \sum_{\substack{i\neq i' \\ i,i'\notin L}} |x_i||x_{i'}| \cdot \Pr{}_h[(h(i)=j)\wedge(h(i')=j) \mid j\in I]\right)$$

$$\Pr_h[h(i) = j \mid j \in I]$$
$$= \Pr_h[h(i) = j \mid \mathcal{F}_{L \cup \{i\}}, j \in I] \cdot \Pr_h[\mathcal{F}_{L \cup \{i\}} \mid j \in I]$$
$$+ \Pr_h[h(i) = j \mid \neg \mathcal{F}_{L \cup \{i\}}, j \in I]$$
$$\times \Pr[\neg \mathcal{F}_{L \cup \{i\}} \mid j \in I]$$
$$\leq \Pr_h[h(i) = j \mid \mathcal{F}_{L \cup \{i\}}, j \in I] + \Pr_h[\neg \mathcal{F}_{L \cup \{i\}} \mid j \in I]$$
$$= \frac{1}{R} + \Pr_h[\neg \mathcal{F}_{L \cup \{i\}} \mid j \in I]$$

FIG. 12

$$\frac{1}{R} + \frac{\Pr_h[\neg \mathcal{F}_{L\cup\{i\}}]}{\Pr_h[j\in I]} \leq \frac{1}{R} + \frac{\Pr_h[\neg \mathcal{F}_{L\cup\{i\}}]}{\Pr_h[j\in I \mid \mathcal{F}_L]\cdot \Pr[\mathcal{F}_L]}$$

$$= \frac{1}{R} + \frac{\Pr_h[\neg \mathcal{F}_{L\cup\{i\}}]}{(1-\frac{1}{R})^{|L|}\cdot \Pr[\mathcal{F}_L]}$$

$$\leq \frac{1}{R} + \frac{\Pr_h[\neg \mathcal{F}_{L\cup\{i\}}]}{(1-\frac{|L|}{R})\cdot \Pr[\mathcal{F}_L]}$$

FIG. 13

$$\begin{aligned}
\Pr[\mathcal{E}_{HH} \wedge \mathcal{E}_F \wedge \mathcal{F}] &\geq \Pr[\mathcal{E}_F \wedge \mathcal{F} | \mathcal{E}_{HH}] \cdot \Pr[\mathcal{E}_{HH}] \\
&= \Pr[\mathcal{E}_F | \mathcal{E}_{HH}] \cdot \Pr[\mathcal{F} | \mathcal{E}_{HH}] \cdot \Pr[\mathcal{E}_{HH}] \\
&\geq \frac{7}{10} \cdot \frac{14}{15} \cdot \frac{19}{20} \\
&> 3/5
\end{aligned}$$

FIG. 14

AGGREGATE CONTRIBUTION OF ICEBERG QUERIES

CROSS-REFERENCE TO RELATED APPLICATION

This application is continuation of and claims priority from U.S. patent application Ser. No. 13/032,013 filed on Feb. 22, 2011; the entire disclosure is herein incorporated by reference in its entirety.

BACKGROUND

The present invention generally relates to data streams, and more particularly relates to measuring distance between data in a data stream.

Recent years have witnessed an explosive growth in the amount of available data. Data stream algorithms have become a quintessential tool for analyzing such data. These algorithms have found diverse applications, such as large scale data processing and data warehousing, machine learning, network monitoring, and sensor networks and compressed sensing. A key ingredient in all these applications is a distance measure between data. In nearest neighbor applications, a database of points is compared to a query point to find the nearest match. In clustering, classification, and kernels, e.g., those used for support vector machines (SVM), given a matrix of points, all pairwise distances between the points are computed. In network traffic analysis and denial of service detection, global flow statistics computed using Net-Flow software are compared at different times via a distance metric. Seemingly unrelated applications, such as the ability to sample an item in a tabular database proportional to its weight, i.e., to sample from the forward distribution, or to sample from the output of a SQL Join, require a distance estimation primitive for proper functionality.

One of the most robust measures of distance is the $l_1$-distance (rectilinear distance), also known as the Manhattan or taxicab distance. The main reason is that this distance is robust is that it less sensitive to outliers. Given vectors $x, y \epsilon^n$, the $l_1$-distance is defined as $$\|x-y\|_1 \stackrel{def}{=} \sum_{i=1}^{n} |x_i - y_i|.$$

This measure, which also equals twice the total variation distance, is often used in statistical applications for comparing empirical distributions, for which it is more meaningful and natural than Euclidean distance. The $l_1$-distance also has a natural interpretation for comparing multisets, whereas Euclidean distance does not. Other applications of $l_1$ include clustering, regression (and with applications to time sequences), Internet-traffic monitoring, and similarity search. In the context of certain nearest-neighbor search problems, "the Manhattan distance metric is consistently more preferable than the Euclidean distance metric for high dimensional data mining applications". The $l_1$-distance may also support faster indexing for similarity search.

Another application is with respect to estimating cascaded norms of a tabular database, i.e. the $l_p$ norm on a list of attributes of a record is first computed, then these values are summed up over records. This problem is known as $l_1(l_p)$ estimation. An example application is in the processing of financial data. In a stock market, changes in stock prices are recorded continuously using a $r_{log}$ quantity known as logarithmic return on investment. To compute the average historical volatility of the stock market from the data, the data is segmented by stock, the variance of the $r_{log}$ values are computed for each stock, and then these variances are averaged over all stocks. This corresponds to an $l_1(l_2)$ computation (normalized by a constant). As a subroutine for computing $l_1(l_2)$, the best known algorithms use a routine for $l_1$-estimation.

BRIEF SUMMARY

In one embodiment, a method for determining a distance between at least two vectors of n coordinates is disclosed. The method comprises identifying a set of heavy coordinates from a set of n coordinates associated with at least two vectors. A heavy coordinate is represented as $|x_i| \geq \epsilon^2 \|x\|_1$, where x is a vector, i is a coordinate in the set of n coordinates, and $\epsilon$ is an arbitrary number. A set of light coordinates is identified from the set of n coordinates associated with the at least two vectors, wherein a light coordinate is represented as $|x_i| < \epsilon^2 \|x\|_1$. A first estimation of a contribution is determined from the set of heavy coordinates to a rectilinear distance between the at least two vectors. A second estimation of a contribution is determined from the set of light coordinates to the rectilinear distance norm. The first estimation is combined with the second estimation.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 shows a bounding of $Var[\Phi|\epsilon]=E[\Phi^2|\epsilon]-E^2[\Phi|\epsilon]$ according to one embodiment of the present invention;

FIG. 3 shows an equality for $E[D_{i,j}^2|\epsilon]$ according to one embodiment of the present invention;

FIG. 4 shows an equality for $Pr[\mathcal{F}_{L \cup \{y\}}^i|\epsilon]$ according to one embodiment of the present invention;

FIG. 5 shows an equality for $E[sign(x_w)sign(x_y)\sigma^{j(w)}(w)\sigma^{j(y)}(y)D_{i(w),j(w)}D_{i(y),j(y)}|\epsilon]$ according to one embodiment of the present invention;

FIG. 6 shows another equality when a set of bounds are combined according to one embodiment of the present invention;

FIG. 7 shows one example of pseudocode of an $l_1$-estimation according to one embodiment of the present invention;

FIG. 8 shows a proof for Lemma 7 according to one embodiment of the present invention;

FIG. 9 shows an equality for $$E_{A,h}\left[\frac{R}{|I|} \cdot \sum_{j \in I} \tilde{L}_1(j) \middle| \mathcal{F}_L, \mathcal{E}_l\right]$$

Figure 15:
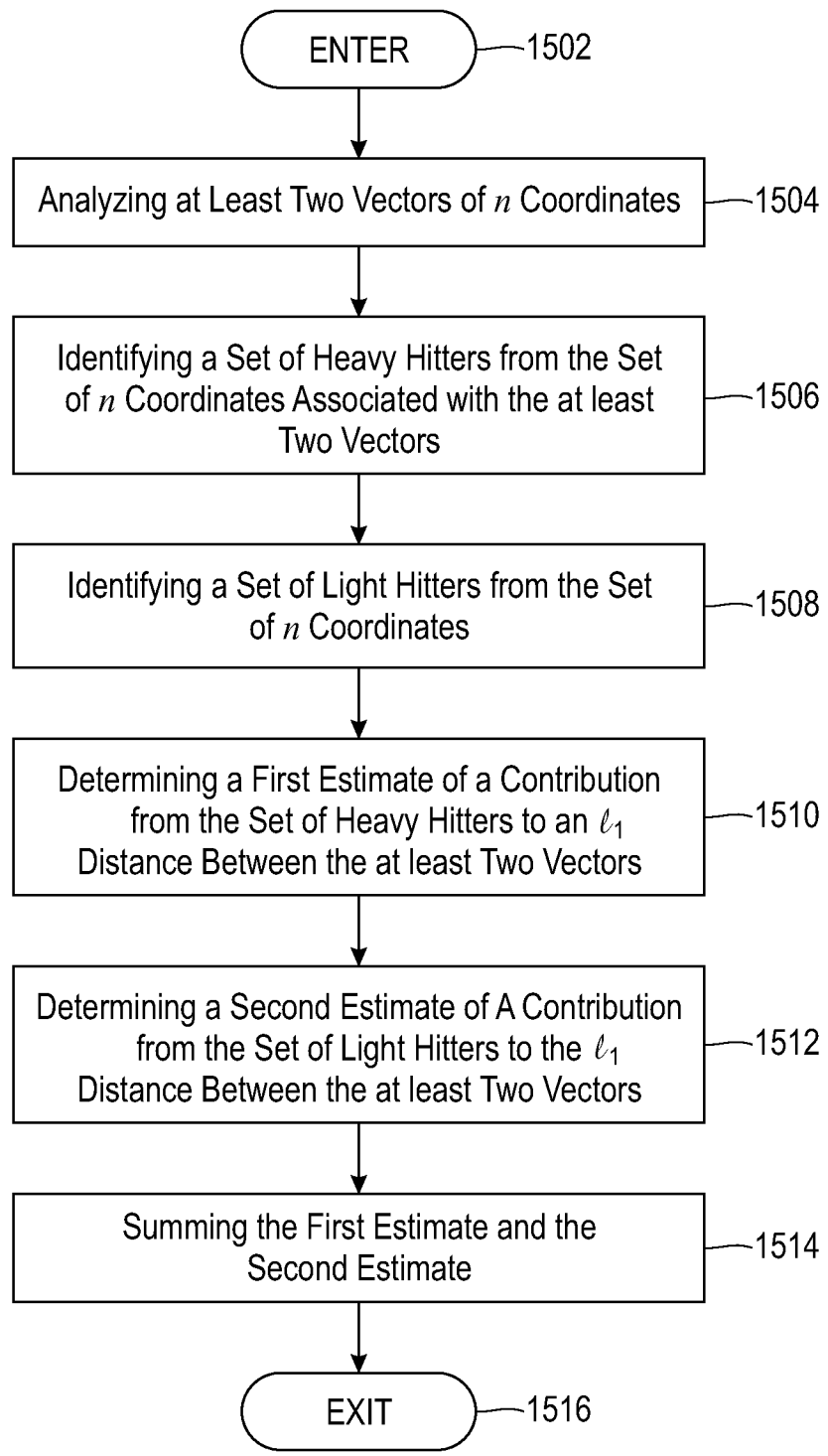

according to one embodiment of the present invention;

FIG. 10 shows an equality for $Pr_h[(h(i)=j) \wedge \epsilon'_1|\mathcal{F}_L]$ according to one embodiment of the present invention;

FIG. 11 shows another equality according to one embodiment of the present invention;

FIG. 12 shows an equality for $Pr_h[h(i)=j|j\in I]$ according to one embodiment of the present invention;

FIG. 13 shows yet another equality based on Bayes' theorem according to one embodiment of the present invention;

FIG. 14 shows a probability of correctness according to one embodiment of the present invention; and FIG. 15 is an operational flow diagram illustrating one example of a process for determination a distance between at least two vectors of n coordinates according to one embodiment of the present invention.

DETAILED DESCRIPTION

Operating Environment

Figure 1:
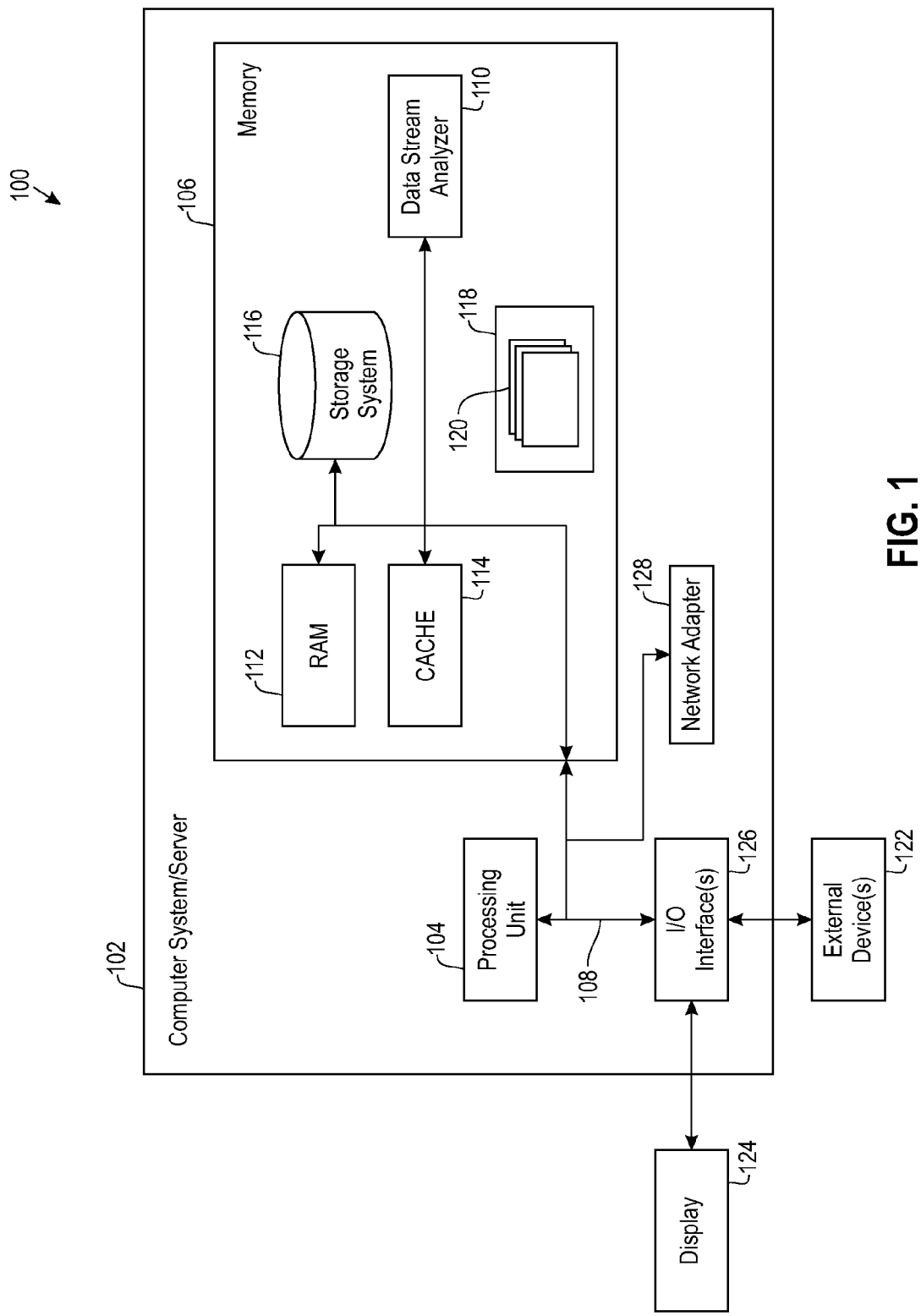
FIG. 1 is a block diagram illustrating one example of an operating environment comprising an adaptive search personalization system according to one embodiment of the present invention.

FIG. 1 shows one example of an operating environment 100 applicable to various embodiments of the present invention. In particular, FIG. 1 shows a computer system/server 102 that is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 1, a computer system/server 102 is shown in the form of a general-purpose computing device. The components of computer system/server 102 can include, but are not limited to, one or more processors or processing units 104, a system memory 106, and a bus 108 that couples various system components including system memory 106 to processor 104. Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 1002, and it includes both volatile and non-volatile media, removable and non-removable media. System memory 106, in one embodiment, comprises a data stream analyzer 110 that performs one or more of the embodiments discussed below with respect to measuring distance between data. It should be noted that the data stream analyzer 110 can also be implemented in hardware as well. The system memory 106 can include computer system readable media in the form of volatile memory, such as random access memory (RAM) 112 and/or cache memory 114.

Computer system/server 102 can further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 118, having a set (at least one) of program modules 120, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 120 generally carry out the functions and/or methodologies of embodiments of the invention as described herein.

Computer system/server 102 may also communicate with one or more external devices 122 such as a keyboard, a pointing device, a display 124, etc.; one or more devices that enable a user to interact with computer system/server 126; and/or any devices (e.g., network card, modem, etc.) that enable computer system/server 102 to communicate with one or more other computing devices. Such communication can occur via I/O interfaces 126. Still yet, computer system/server 102 can communicate with one or more networks such as a local area network (LAN), a general wide area network (WAN), and/or a public network (e.g., the Internet) via network adapter 128. As depicted, network adapter 1026 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Overview

The inventors paper entitled "*Fast Manhattan Sketches in Data Streams*", by Jelani Nelson and David P. Woodruff, ACM PODS '10 Indiana, Ind., USA which is hereby incorporated by reference in its entirety. As discussed above, the $l_1$-distance, also known as the Manhattan or taxicab distance, between two vectors x, y in $^n$ is $$\sum_{i=1}^{n} |x_i - y_i|.$$

Approximating this distance is a fundamental primitive on massive databases, with applications to clustering, nearest neighbor search, network monitoring, regression, sampling, and support vector machines. One or more embodiments of the present invention are directed to the problem of estimating the $l_1$-distance in the most general turnstile model of data streaming.

Formally, given a total of m updates (positive or negative) to an n-dimensional vector x, one or more embodiments maintain a succinct summary, or sketch, of what has been seen so that at any point in time the data stream analyzer can output an estimate E(x) so that with high probability, $(1-\epsilon)\|x\|_1 \leq E(x) \leq (1-\epsilon)\|x\|_1$, where $\epsilon > 0$ is a tunable approximation parameter. Here, an update has the form (i, v), meaning that the value v should be added to coordinate i. One or more embodiments assume that v is an integer (this is without loss of generality by scaling), and that $|v| \leq M$, where M is a parameter. Updates can be interleaved and presented in an arbitrary order. Of interest is the amount of memory to store the sketch, the amount of time to process a coordinate update, and the amount of time to output an estimate upon request.

One or more embodiments of the present invention are advantageous because they give the first 1-pass streaming algorithm for this problem in the turnstile model with $O^*(\epsilon^{-2})$ space and $O^*(1)$ update time where the bounds are optimal up to $O^*(1)$ factors. The $O^*$ notation hides polylogarithmic factors in $\epsilon$, n, and the precision required to store vector entries. In particular, one or more embodiments provide 1-pass algorithm using $\epsilon^{-2}$ polylog(nmM)space for $l_1$-estimation in data streams with polylog(nmM) update time, and reporting time $\epsilon^{-2}$ polylog(nmM). This algorithm is simultaneously optimal in both the space and the update time up to polylog(nmM) factors. Conventional algorithms either required at least $\epsilon^{-3}$ polylog(nmM)bits of space, or at least $\epsilon^{-2}$ update time. As $\epsilon$ can be arbitrarily small, the result of one or more embodiments can provide a substantial benefit over conventional algorithms. In light of known lower bounds, the space and time complexity of these one or more embodiments are optimal up to polylog(nmM) factors.

It should be noted that in the following discussion, for a function $f$ the notation $O^*(f)$ is used to denote a function $g = O(f \cdot \text{polylog}(nm M/\epsilon))$. $\Theta^*$ and $\Omega^*$ are similarly defined.

The improvements provided by one or more embodiments of the present invention result in corresponding gains for the aforementioned applications. Examples include the scan for nearest neighbor search, for which to obtain sketches of size $O^*(\epsilon^{-2})$, these embodiments reduce the preprocessing time from $O(nd\epsilon^{-2})$ to $O^*(nd)$. These embodiments also shave an $\epsilon^{-2}$ factor in the time for computing all pairwise $l_1$-distance, in the update time for sampling from the forward distribution, in the time for comparing two collections of traffic-flow summaries, and in the time for estimating cascaded norms.

Techniques

Using the Cauchy sketches of Li (particularly, the geometric mean estimator) would require $\Omega^*(\epsilon^{-2})$ update time. Multi-level sketches can be used, incurring an extra $\Omega^*(\epsilon^{-1})$ factor in the space. Various embodiments of the present invention achieve $O^*(1)$ update time by using Cauchy sketches (and particularly, Li's geometric mean estimator). However, to achieve this result one or more embodiments preprocess and partition the data, as discussed in greater detail below.

A Cauchy sketch is now described. Given a vector x, the sketch is a collection of Counters $$Y_j = \sum_{i=1}^{n} x_1 C_{i,j}$$

for j=1, ..., k, where the $C_{i,j}$ are standard Cauchy random variables with probability density function $$\mu(y) = \frac{1}{\pi(1+y^2)}.$$

The $C_{i,j}$ are generated pseudo-randomly using a pseudo-random generator (PRG). By the 1-stability of the Cauchy distribution, $Y_j$ is also distributed as a standard Cauchy random variable, scaled by $\|x\|_1$. Li shows that there is a constant $c_k > 0$ so that for any $k \geq 3$, if $k \geq 3$, if $Y_1, \ldots, Y_k$ are independent Cauchy sketches, then the geometric mean estimator $$\text{Est}_{GM} = c_k \cdot (|Y_1| \cdot |Y_2| \ldots |Y_k|)^{1/k}$$

has an expected value $E[\text{Est}_{GM}] = \|x\|_1$ and a variance of Var$[\text{Est}_{GM}] = \Theta(\|x\|_1^2/k)$. The space and time complexity of maintaining the $Y_j$ in a data stream are $O^*(k)$, and by linearity, can be computed in a single pass. By Chebyshev's inequality, for $k = \Theta(\epsilon^{-2})$ one obtains a $(1 \pm \epsilon)$-approximation to $\|x\|_1$ with constant probability, which can be amplified by taking the median of independent repetitions. While the space needed is $O^*(\epsilon^{-2})$, so is the update time.

The starting point of one or more embodiments is the following idea. Suppose the coordinates into $\Theta(\epsilon^{-2})$ are randomly partitioned into buckets. In each bucket Li's estimator is maintained, but only with parameter k=3. Given an update to a coordinate i, it lands in a unique bucket, and the contents of this bucket can be updated in $O^*(1)$ time. Using $\Theta(\epsilon^{-2})$ buckets, the space is also $O^*(\epsilon^{-2})$. One is then faced with the following temptation: letting $G_i$ be the estimate returned by Li's procedure in bucket i for k=3, output $$G = \sum_{i=1}^{r} G_i.$$

From the properties of the $G_i$, this is correct in expectation.

The main wrinkle is that Var[G] can be as large as $\Omega(\|x\|_1^2)$, which is not good enough. To see that this can happen, suppose x contains only a single non-zero coordinate $x_1 = 1$. In the bucket containing $x_1$, the value G of Li's estimator is the geometric mean of 3 standard Cauchy random variables. By the above, Var[G]=$\Theta(\|x\|_1^2/k)=\Theta(\|x\|_1^2)$.

Note though in the above example, $x_1$ contributed a large fraction of the $l_1$ mass of x (in fact, all of it). The main idea of one or more embodiments then is the following. A $\phi$-heavy coordinate of the vector x is a coordinate i for which $|x_i| \geq \phi \cdot \|x\|_1$. Algorithms for finding heavy coordinates, also known as iceberg queries, have been extensively studied in the database community, and such algorithms in the algorithm of one or more embodiments of the present invention. Set $\phi = \epsilon^2$. Every $\phi$-heavy coordinate is removed from x, the contribution of these heavy coordinates are estimated separately, then the bucketing above is used on the remaining coordinates. This reduces Var[G] to $O(\|x_{tail}\|_2^2)$, where $x_{tail}$ is the vector obtained from x by removing the heavy coordinates. A calculation shows that $O(\|x_{tail}\|_2^2)=O(\epsilon^2\|x\|_1^2)$, which is good enough to argue that $\|x_{tail}\|_1$ can be estimated to within an additive $\epsilon\|x\|_1$ with constant probability. This idea can be implemented in a single pass.

The main remaining hurdle is estimating $\|x_{head}\|_1$, the contribution to $\|X\|_1$ from the heavy coordinates. Using current techniques the CountMin sketch, can be used to estimate the value of each $\epsilon^2$-heavy coordinate up to an additive $\epsilon^3\|x\|_1$. Summing the estimates gives $\|x_{head}\|_1$ up to an additive $\epsilon\|x\|_1$. This, however, requires $\Omega^*(\epsilon^{-3})$ space, which, in some embodiments, cannot be afforded. Instead, a new subroutine, Filter, is designed that estimates the sum of the absolute values of the heavy coordinates, i.e., the value $\|x_{head}\|_1$, up to an additive $\epsilon\|x\|_1$, without guaranteeing an accurate frequency estimate to any individual heavy coordinate. This relaxed guarantee is sufficient for correctness of our overall algorithm, and is implementable in $O^*(\epsilon^{-2})$ space.

Other technical complications arise due to the fact that the partitioning is not truly random, nor is the randomness used by Li's estimator. Therefore, one or more embodiments use a family that is close to an $O(\epsilon^{-2})$-wise independent family, but doesn't suffer the $O(\epsilon^{-2})$ evaluation time required of functions in such families (e.g., $O(\epsilon^{-2})$-degree polynomial evaluation). These functions can be evaluated in constant time. The caveat is that the correctness analysis needs more attention.

Preliminaries

The algorithm used by the data stream analyzer 110 operates, in one embodiment, in the following model. A vector x of length n is initialized to 0, and it is updated in a stream of m updates from the set $[n] \times \{-M, \ldots, M\}$. An update (i, v) corresponds to the change $x_i \leftarrow x_i + v$. In one embodiment, a $(1 \pm \epsilon)$-approximation to $$\|x\|_1 = \sum_{i=1}^n |x_i|$$

is computed for some given parameter $\epsilon > 0$. All space bounds in this discussion are in bits, and all logarithms are base 2, unless explicitly stated otherwise. Running times are measured as the number of standard machine word operations (integer arithmetic, bitwise operations, and bitshifts). A differentiation is made between update time, which is the time to process a stream update, and reporting time, which is the time required to output an answer. Each machine word is assumed to be $\Omega(\log(nmM/\epsilon))$ bits so that index each vector can be indexed and arithmetic can be performed on vector entries and the input approximation parameter in constant time.

Throughout this discussion, for integer z, [z] is used to denote the set $\{1, \ldots, z\}$. For reals A, B, $A \pm B$ is used to denote some value in the interval [A−B, A+B]. Whenever a frequency $x_i$ is discussed, that frequency at the stream's end is being referred to. It is also assumes $\|x\|_1 \neq 0$ without loss of generality (note $\|x\|_1 = 0$ iff $\|x\|_2 = 0$, and the latter can be detected with arbitrarily large constant probability in O(log (nmM)) space and O(1) update and reporting time by, say, the AMS sketch), and that $\epsilon < \epsilon_0$ for some fixed constant $\epsilon_0$.

$l_1$ Streaming Algorithm

The $l_1$ streaming algorithm used by the data stream analyzer 110 for $(1 \pm \epsilon)$-approximating $\|x\|_1$ is now discussed in greater detail. As discussed in above, the algorithm works by estimating the contribution to $l_1$ from the heavy coordinates and non-heavy coordinates separately, then summing these estimates.

A "$\phi$-heavy coordinate" is an index i such that that $|x_i| \geq \phi\|x\|_1$. A known heavy coordinate algorithm is used for the turnstile model of streaming (the model currently being operating in) to identify the $\epsilon^2$-heavy coordinates. Given this information, a subroutine, Filter (discussed below), is used to estimate the contribution of these heavy coordinates to $l_1$ up to an additive error of $\epsilon\|x\|_1$. This takes care of the contribution from heavy coordinates. $R = \Theta(1/\epsilon^2)$ "buckets" $B_i$ are maintained in parallel, which the contribution from non-heavy coordinates to be estimated. Each index in [n] is hashed to exactly one bucket $i \in [R]$. The ith bucket keeps track of the dot product of x, restricted to those indices hashed to i, with three random Cauchy vectors, a known unbiased estimator of $l_1$ is applied due to Li (the "geometric mean estimator") to estimate the $l_1$ norm of x restricted to indices hashed to i. The estimates from the buckets not containing any $\epsilon^2$-heavy coordinates are then sum up (some scaling of). The value of the summed estimates turns out to be approximately correct in expectation. Then, using that the summed estimates only come from buckets without heavy coordinates, it can be shown that the variance is also fairly small, which then shows that the estimation of the contribution from the non-heavy coordinates is correct up to $\epsilon\|x\|_1$ with large probability.

The Filter Data Structure: Estimating the Contribution from Heavy Coordinates

In this section, it is assumed that a subset $L \subset [n]$ of indices i is known so that (1) for all i for which $|x_i| \geq \epsilon^2\|x\|_1$, and (2) for all $i \in L$, $|x_i| \geq (\epsilon^2/2)\|x\|_1$. Note this implies $|L| \leq 2/\epsilon^2$. Furthermore, it is also assumed that $\text{sign}(x_i)$ is known for each $i \in L$. Throughout this discussion, $x_{head}$ denotes the vector x projected onto coordinates in L, so that $$\sum_{i \in L} |x_i| = \|x_{head}\|_1.$$

The culmination of this section is Theorem 3, which shows that an estimate $\Phi = \|x_{head}\|_1 \pm \epsilon\|x\|_1$ in small space with large probability can be obtained via a subroutine referred to herein as Filter. The following uniform has family construction given is used.

THEOREM 1. Let $S \subset U = [u]$ be a set of $z > 1$ elements, and let $V = [v]$, with $1 < v \leq u$. Suppose the machine word size is $\Omega(\log(u))$. For any constant $c > 0$ there is a word RAM algorithm that, using time $\log(z) \log^{O(1)}(v)$ and $O(\log(z) + \log \log(u))$ bits of space, selects a family of $\mathcal{H}$ functions from U to V (independent of S) such that:

1. With probability $1 - O(1/z^c)$, $\mathcal{H}$ is z-wise independent when restricted to S.

2. Any $h \in \mathcal{H}$ (can be represented by a RAM data structure using $O(z \log(v))$ bits of space, and h can be evaluated in constant time after an initialization step taking O(z) time.

The BasicFilter data structure can be defined as follows. Choose a random sign vector $\sigma \in \{-1, 1\}^n$ from a 4-wise independent family. Put $r = \lceil 27/\epsilon^2 \rceil$. A hash function $h:[n] \to [r]$ is chosen at random from a family $\mathcal{H}$ constructed randomly as in Theorem 1 with u=n, v=z=r, c=1. Note $|L|+1 < z$. Also, r counters $b_1, \ldots, b_r$ are initialized to 0. Given an update of the form (i, v), add $\sigma(i) \cdot v$ to $b_{h(i)}$.

The Filter data structure is defined as follows. Initialize $s = \lceil \log 3(1/\epsilon^2) \rceil + 3$ independent copies of the BasicFilter data structure. Given an update (i, v), perform the update described above to each of the copies of BasicFilter. This data structure can be thought of as an s×r matrix of counters $D_{i,j}$, $i \in [s]$ and $j \in [r]$. The variable $\sigma^i$ denotes the sign vector $\sigma$ in the i-th independent instantiation of BasicFilter, and similarly define $h^i$ and $\mathcal{H}^i$. Notice that the space complexity of Filter is $O(\epsilon^{-2} \log(1/\epsilon)\log(mM) + \log(1/\epsilon)\log \log n)$, where O represents a constant C that is independent of n. The update time is $O(\log(1/\epsilon))$.

For each $w \in L$ for which $h^i(w) = j$, say a count $D_{i,j}$ is good for w if for all $y \in L \setminus \{w\}$, $h^i(y) \neq j$. Since $h^i$ is |L|-wise independent when restricted to L with probability at least $1 - 1/r$, $\Pr[D_{i,j}$ is good for $w] \geq (1 - 1/r) \cdot (1 - (|i| - 1)/r) \geq 2/3$, where the second inequality holds for $i \leq 1$. It follows that since Filter is the concatenation of s independent copies of BasicFilter, $$\frac{Pr[\forall w \in L, \exists i \in [s] \text{ for which } D_{i,h'(w)} \text{ is good for } w]}{Pr[\forall w \in L, \exists i \in [s] \text{ for which } D_{i,h'(w)} \text{ is good for } w]} \geq \quad \text{(EQ. 1)}$$

$$1 - |L| \cdot \left(\frac{1}{3s}\right) > \frac{9}{10}$$

Let $\epsilon$ be the event of EQ. (1).

The following estimator $\Phi$ of $\|x_{head}\|_1$ is defined given the data in the Filter structure, together with the list L. It is also assumed that $\epsilon$ holds, else the estimator is not well-defined. For each $w \in L$, let $i(w)$ be the smallest $i$ for which $D_{i,h^i(w)}$ is good for w, and let $j(w) = h^{i(w)}(i)$. The estimator is then $$\Phi = \sum_{w \in L} \text{sign}(x_w) \cdot \sigma^{i(w)}(w) \cdot D_{i(w),j(w)}$$

with $\sigma$ being a random vector, each of its entries is either +1 or −1. Note that the Filter data structure comprises universal hashing replaced by uniform hashing, and has different estimation procedure that the CountSketch structure.

LEMMA 2: $E[\Phi|\epsilon] = \|x_{head}\|_1$ and $\text{Var}[\Phi|\epsilon] \leq 2\epsilon^2 \|x\|_1^2/9$ Proof: By linearity expectation, $$E[\Phi|\mathcal{E}] = \sum_{w \in L} E[\text{sign}(x_w) \cdot \sigma^{i(w)}(w) \cdot D_{i(w),j(w)} | \mathcal{E}]$$

Fix a $w \in L$, and for notational convenience let $i=i(w)$ and $j=j(w)$. For each $y \in [n]$, set $\Gamma(y)=1$ if $h^i(i)=j$, and set $\Gamma(y)=0$ otherwise. Then $$E_{\sigma^i,h^i}[\text{sign}(x_w) \cdot \sigma^i(w) \cdot D_{i,j} | \mathcal{E}] = \sum_y E_{\sigma^i,h^i}[\text{sign}(x_w)x_y^\Gamma(y)\sigma^i(y)\sigma^i(w) | \mathcal{E}]$$

Consider any fixing of $h^i$ subject to the occurrence of $\epsilon$, and notice that $\sigma^i$ is independent of $h^i$. Since $\sigma^i$ is 4-wise independent, it follows that $$E_{\sigma^i}[\text{sign}(x_w) \cdot \sigma^i(w) \cdot D_{i,j} | h^i] = \quad \text{(EQ. 2)}$$
$$E_{\sigma^i,h^i}[\text{sign}(x_w)x_w^\Gamma(w)\sigma^i(w)\sigma^i(w)] = |x_w|,$$

and hence $$E[\Phi|\mathcal{E}] = \sum_{w \in L} |x_w| = \|x_{head}\|_1$$

A bounding is now performed for $\text{Var}[\Phi|\epsilon] = E[\Phi^2|\epsilon] - E^2[\Phi|\epsilon]$, or equivalently, the function shown in FIG. 2. First $$\sum_{w \in L} E[D_{i(w),j(w)}^2 | \mathcal{E}]$$

is bound. A $w \in L$ is fixed, and for notational convenience, put $i(w)$ and $j=j(w)$. Then $E[D_{i,j}^2|\epsilon]$ is equal to that shown in FIG. 3, where the second equality follows from the fact that $\sigma^i$ is 4-wise independent and independent of $\epsilon$. Note $Pr[h^i(y)=j|\epsilon]=0$ for any $y \in (L\setminus\{w\})$, and $Pr[h^i(w)=j|\epsilon]=1$ by definition.

Now consider a coordinate $y \notin L$. For $S \subseteq [n]$ let $\mathcal{F}_S^i$ be the event that $\mathcal{H}^i$ is $|S|$-wise independent when restricted to S. By Bayes' rule $Pr[\mathcal{F}_{L \cup \{y\}}^i|\epsilon]$ is equal to that shown in FIG. 4. Conditioned on $\mathcal{F}_{L \cup \{y\}}^i$, the value $h^i(y)$ is uniformly random even given the images of all members in L under $h^i$. Thus, $Pr[h^i(y)=j|\epsilon] \leq 10/(9r)+1/r < 3/r$. Since the bucket is good for w, the total contribution of such y to $E[D_{i,j}^2|\epsilon]$ is at most $3 \cdot \|x_{tail}\|_2^2/r$, where $x_{tail}$ is the vector x with the coordinates in L removed. The $\|x_{tail}\|_2^2$ is maximized when there are $\epsilon^{-2}$ coordinates each of magnitude $\epsilon^2 \|x\|_1$. In this case $\|x_{tail}\|_2^2 = \epsilon^2 \|x\|_1^2$.

Hence, $$E[D_{i,j}^2|\epsilon] \leq x_w^2 + 3\epsilon^2 \|x\|_1^2/r \leq x_w^2 + \epsilon^4 \|x\|_1^2/9$$

As $|L| \leq 2\epsilon^{-2}$, it follows that $$\sum_{w \in L} E[D_{i(w),j(w)}^2 | \mathcal{E}] \leq 2\epsilon^2 \|x\|_1^2/9 + \sum_{w \in L} x_w^2$$

Now turning to bounding $$\sum_{w \neq y \in L} E[\text{sign}(x_w)\text{sign}(x_y)\sigma^{i(w)}(w)\sigma^{i(y)}(y) \times D_{i(w),j(w)}D_{i(y),j(y)} \mathcal{E}|]$$

Fix distinct w, $y \in L$. Note that $(i(w), j(w)) \neq (i(y), j(y))$ conditioned on $\epsilon$ occurring. Suppose first that $i(w) \neq i(y)$, then the equality shown in FIG. 5 is obtained since it holds for any fisted $h^{i(w)}, h^{i(y)}$, where the final equality follows from EQ 2.

Now suppose that $i(w)=i(y)$. Let $i=i(w)=i(y)$ for notational convenience. Define the indicator random variable $\Gamma^w(z)=1$ if $h^i(z)=j(w)$, and similarly let $\Gamma^y(z)=1$ if $h^i(z)=j(y)$. Then the expression $E[\text{sign}(x_w)\text{sign}(x_y)\sigma^{i(w)}(w)\sigma^{i(y)}(y)D_{i(w),j(w)} D_{i(y),j(y)}|\epsilon]$ can be expanded using the definition $D_{i(w),j(w)}$ and $D_{i(y),j(y)}$ as:

$$\sum_{z,z'} E[\text{sign}(x_w)\text{sign}(x_y)x_z x_{z'} \Gamma^w(z)\Gamma^y(z')\sigma^i(z)\sigma^i(z') \times \sigma^i(w)\sigma^i(y) | \mathcal{E}]$$

The variables z and z' are fixed and a summand of the form $$E[\text{sign}(x_w)\text{sign}(x_y)x_z x_{z'} \Gamma^w(z)\Gamma^y(z') \times \sigma^i(z)\sigma^i(z')\sigma^i(w)\sigma^i(y)|\epsilon]$$

is analyzed.

Consider any fixing of $h^i$ subject to the occurrence of $\epsilon$, and recall that $\sigma^i$ is independent of $h^i$. Since $\sigma^i$ is 4-wise independent and a sign vector, it follows that this summand vanishes unless $\{z, z'\} = \{w, y\}$. Moreover, since $\Gamma^w(y) = \Gamma^y(w) = 0$, while $\Gamma^w(w) = \Gamma^y(y) = 1$, then there must be the following, $z=w$ and $z'=y$. In this case, $$E[\text{sign}(x_w)\text{sign}(x_y)x_z x_{z'} \Gamma^w(z)\Gamma^y(z') \times \sigma^i(z)\sigma^i(z')\sigma^i(w)\sigma^i(y)|h^i] = |x_w| \cdot |x_y|.$$

Hence, the total contribution of all distinct w, y∈L to Var[Φ|ε] is at most $$\sum_{w \neq y \in L} |x_w| \cdot |x_y|.$$

Combining the bounds, it follows that the equalities in FIG. 6 are true. This completes the proof of the lemma.

By Chebyshev's inequality, Lemma 2 implies $$Pr[|\Phi - \|x_{head}\|_1| \geq \varepsilon \|x\|_1 \mid \mathcal{E}] \leq \frac{Var[\Phi \mid \mathcal{E}]}{\varepsilon^2 \|x\|_1^2} \leq \frac{2\varepsilon^2 \|x\|_1^2}{9\varepsilon^2 \|x\|_1^2} = \frac{2}{9}$$

and thus $$Pr[(|\Phi - \|x_{head}\|_1| \leq \varepsilon \|x\|_1) \wedge \varepsilon] \geq \left(\frac{7}{9}\right) \cdot \left(\frac{9}{10}\right) = \frac{7}{10}.$$

The above findings are summarized with the following theorem:

THEOREM 3: Suppose that is a set $L \subset [n]$ of indices j so that (1) for all j for which $|x_j| \geq \varepsilon^2 \|x\|_1$, $j \in L$ and (2) for all $j \in L$, $|x_j| \geq (\varepsilon^2/2) \|x\|_1$. Further, suppose $sign(x_j)$ is known for each $j \in L$. Then, there is a 1-pass algorithm, Filter, which outputs an estimate for which with probability at least 7/10, $|\Phi - \|x_{head}\|_1| \leq \varepsilon \|x\|_1$. The space complexity of the algorithm is $O(\varepsilon^{-2} \log(1/\varepsilon) \log(mM) + \log(1/\varepsilon) \log \log n)$. The update time is $O(\log(1/\varepsilon))$, and the reporting time is $O(\varepsilon^{-2} \log(1/\varepsilon))$.

The Final Algorithm

The final algorithm for $(1 \pm \varepsilon)$-approximating $\|x\|_1$, which was outlined above is now analyzed. The full details of the algorithm are shown in FIG. 7. Before giving the algorithm and analysis, the $l_1$ heavy coordinates problem is defined.

Definition 4: Let $0 < \gamma < \phi$ and $\delta > 0$ be given. In the $l_1$ heavy coordinates problem, with probability at least $1 - \delta$ a list $L \subset [n]$ is outputted such that:

1. For all i with $|x_i| \geq \phi \|x\|_1$, $i \in L$, $i \in L$.
2. For all $i \in L$, $|x_i| > (\phi - \gamma) \|x\|_1$.
3. For each $i \in L$, an estimate $\hat{x}_i$ is provided such that $|\hat{x}_i - x_i| < \gamma \|x\|_1$.

Note that for $\gamma \leq \phi/2$, the last two items above imply $sign(x_i)$ can be determined for $i \in L$. For a generic algorithm solving the $l_1$ heavy coordinates problem HHUpdate($\phi$), HHReport($\phi$), and HHSpace($\phi$) are used to denote update time, reporting time, and space, respectively, with parameter $\phi$ and $\gamma = \phi/2$, $\delta = 1/20$.

There exist a few of solutions to the $l_1$ heavy coordinates problem in the turnstile model. The work gives an algorithm with HHSpace($\phi$)=$O(\phi^{-1} \log(mM)\log(n))$, HHUpdate($\phi$)=$O(\log(n))$, and with HHReport($\phi$)=$O(n \log(n))$, and gives an algorithm with HHSpace($\phi$)=$O(\phi^{-1} \log(\phi n) \log \log(\phi n) \log(1/\phi) \log(mM))$, and with HHUpdate($\phi$)=$O(\log(\phi n) \log \log(n) \log(1/\phi))$, and HHReport($\phi$)=$O(\phi^{-1} \log(\phi n) \log \log(\phi n) \log(1/\phi))$.

Also, the following theorem follows from Lemma 2.2 (with k=3 in their notation). In Theorem 5 (and in FIG. 7), the Cauchy distribution is a continuous probability distribution defined by its density function $\mu(x)=(\pi(1+x^2))^{-1}$. One can generate a Cauchy random variable X by setting $X=\tan(\pi U/2)$ for U a random variable uniform in [0, 1]. Of course, to actually implement our algorithm (or that of Theorem 5) one can only afford to store these random variables to some finite precision; this is discussed in Remark 9 below.

THEOREM 5: For an integer n>0, let $A_1[j], \ldots, A_n[j]$ be 3n independent Cauchy random variables for j=1, 2, 3. Let $x \in \mathbb{R}^n$ be arbitrary. Then given $$C_j = \sum_{i=1}^{n} A_i[j] \cdot x_i$$

for j=1, 2, 3, the estimator $$Est_{GM} = Est_{GM}(C_1, C_2, C_3) = \frac{8\sqrt{3}}{9} \cdot \sqrt[3]{|C_1| \cdot |C_2| \cdot |C_3|}$$

satisfies the following two properties:

1. $E[Est_{GM}] = \|x\|_1$

2. $Var[Est_{GM}] = \frac{19}{8} \cdot \|x\|_1^2$

It is shown in Theorem 6 that the algorithm outputs $(1 \pm O(\varepsilon)) \|x\|_1$ with probability at least 3/5. Note this error term can be made $\varepsilon$ by running the algorithm with $\varepsilon$ being $\varepsilon$ times a sufficiently small constant. Also, the success probability can be boosted to $1 - \delta$ by running $O(\log(1/\delta))$ instantiations of the algorithm in parallel and returning the median output across all instantiations.

THEOREM 6: The algorithm of FIG. 7 outputs $(1 \pm O(\varepsilon)) \|x\|_1$ with probability at least 3/5.

PROOF: Throughout this proof A is used to denote the 3n-tuple $(A_1[1], \ldots, A_n[1], \ldots, A_1[3], \ldots, A_n[3])$, and for $S \subset [n]$, $\mathcal{F}_s$ is the event that the hash family $\mathcal{H}$ that is randomly selected in Step 3 via Theorem 1 is $|S|$-wise independent when restricted to S. For an event $\varepsilon$, $1_\varepsilon$ denotes the indicator random variable for $\varepsilon$. The variable $x_{head}$ is used denote x projected onto the coordinates in L, and $x_{tail}$ is used to denote the remaining coordinates. Note $\|x\|_1 = \|x_{head}\|_1 + \|x_{tail}\|_1$.

The following lemma will now be proved. The proof requires some care since h is not always a uniform hash function on small sets, but is only so on any particular (small) set with large probability.

LEMMA 7: Conditioned on the randomness of HH of FIG. 7, $$E_{A,h}\left[\frac{R}{|I|} \cdot \sum_{j \in I} \tilde{L}_1(j)\right] = (1 \pm O(\varepsilon)) \|x_{tail}\|_1.$$

PROOF: For $\rho = 1 - Pr(\mathcal{F}_L)$, see FIG. 8, by Theorem 1 and Theorem 5.

The above expectation is now computed conditioned on I. Let $\varepsilon'_1$ be the event I=I' for an arbitrary I'. Then, see FIG. 9. Now, see FIG. 10. It should be noted that if $\mathcal{F}_{L \cup \{i\}}$ occurs, the $\varepsilon_{I'}$ is independent of the event h(i)=j. Also, if $\mathcal{F}_L$ occurs, then $\varepsilon_{I'}$ is independent of $\mathcal{F}_{L \cup \{i\}}$.

Thus, the above equals $$Pr_h[h(i)=j|\mathcal{F}_{L \cup \{i\}}] \cdot Pr_h[\varepsilon_{I'}|\mathcal{F}_L] \cdot Pr[\mathcal{F}_{L \cup \{i\}} | \mathcal{F}_L] + Pr[\neg \mathcal{F}_{L \cup \{i\}} | \mathcal{F}_L] \cdot Pr[\varepsilon_{I'} | \mathcal{F}_L] \times Pr[h(i)=j | \neg \mathcal{F}_{L \cup \{i\}}, \mathcal{F}_L, \varepsilon_{I'}]$$

Note $\Pr[\neg \mathcal{F}_{L\cup\{i\}}|\mathcal{F}_L] \leq \Pr[\neg \mathcal{F}_{L\cup\{i\}}]/\Pr[\mathcal{F}_L]\rho'_i/(1-\rho)$ for $\rho'_i = 1 - \Pr[\mathcal{F}_{L\cup\{i\}}]$. Also, $\Pr[\mathcal{F}_{L\cup\{i\}}|\mathcal{F}_L] \geq \Pr[\mathcal{F}_{L\cup\{i\}}]$ since $\Pr[\mathcal{F}_{L\cup\{i\}}]$ is a weighted average of $\Pr[\mathcal{F}_{L\cup\{i\}}|\mathcal{F}_L]$ and $\Pr[_{L\cup\{i\}}|\neg \mathcal{F}_L]$, and the latter is 0. This for some $\rho''_i \in [0,\rho'_i]$ EQ. (4) is $$\frac{R}{|I|} \cdot \sum_{j \in I} \sum_{i \notin L} |x|_i \cdot \left(\frac{1-\rho''_i}{R} \pm \frac{\rho'_i}{1-\rho}\right) =$$

$$\|x_{tail}\|_1 - \sum_{i \in L} \rho''_i |x|_i \pm \left(\frac{\max_i \rho'_i}{1-\rho}\right) \cdot R \cdot \|x_{tail}\|_1.$$

By the setting of c=2 when picking the hash family of Theorem 1 in Step 3, $\rho,\rho'_i,\rho''_i = O(\epsilon^3)$ for all I, and thus $\rho'_i/(1-\rho)\cdot R = O(\epsilon)$, implying the above is $(1\pm O(\epsilon))\|x_{tail}\|_1$. Plugging this into EQ. 3 then shows that the desired expectation is $(1\pm O(\epsilon))\|x_{tail}\|_1$.

The expected variance of $$(R/|I|) \cdot \sum_{j \in I} \tilde{L}_1(j)$$

is now bound.

LEMMA 8: Conditioned on HH being correct, $$E_h\left[Var_A\left[\frac{R}{|I|} \cdot \sum_{j \in I} \tilde{L}_1(j)\right]\right] = O(\varepsilon^2 \cdot \|x\|_1^2).$$

PROOF: For any fixed h, R/|I| is determined and the $\tilde{L}_1(j)$ are pairwise independent. Thus for fixed h, $$Var_A\left[\frac{R}{|I|} \cdot \sum_{j \in I} \tilde{L}_1(j)\right] = \left(\frac{R}{|I|}\right)^2 \cdot \sum_{j \in I} Var_A[\tilde{L}_1(j)].$$

First observe that since $|I| \geq R - |L| \geq 2/\epsilon^2$, for any choice of h $R/|I| \leq 2$. Thus, up to a constant factor, the expectation that is trying to be computed is $$E_h\left[Var_A\left[\sum_{j \in I} \tilde{L}_1(j)\right]\right].$$

For notational convenience, $\tilde{L}_1(j)=0$ if $j \neq I$. Now see FIG. 11. Now consider the quantity $\Pr_h[h(i)=j|j\in I]$. Then $\Pr_h[h(i)=j|j\in I]$ is equal to that shown in FIG. 12. Then by Bayes' theorem, what is shown in FIG. 12 is at most that which is shown in FIG. 13. Note that $|L|/R \leq \frac{1}{2}$. Also, by choice of c, z I the application of Theorem 1 in step 3, $\Pr[\mathcal{F}_L]=1-O(\epsilon)$ and $\Pr[\neg \mathcal{F}_{L\cup\{i\}}]=O(1/R^2)$. Thus overall $\Pr_h[h(i)=j|j\in I]=O(1/R)$.

An essentially identical calculation, but conditioning on $\mathcal{F}_{L\cup\{i,i'\}}$ instead of gives that $\Pr_h[(h(i)=j)\wedge (h(i')=j)|j\in I]=O(1/R^2)$. Combining these bounds with Eq. 5, the expected variance that is trying to be computed is $O(\|x_{tail}\|_2^2 + \|x_{tail}\|_1^2/R)$.

The second summand is $O(\epsilon^2 \|x\|_1^2)$. For the first summand, conditioned on HH being correct, every $\|x_i\|$ for $i \notin L$ has $|x_i| \leq \epsilon^2 \|x\|_1$. Under this constraint, $\|x_{tail}\|_2^2$ is maximized when there are exactly $1/\epsilon^2$ coordinates $i \in L$ each with $|x_i| = \epsilon^2 \|x\|_1$, in which case $\|x_{tail}\|_2^2 = \epsilon^2 \|x\|_1^2$.

The proof of correctness of the full algorithm shown in FIG. 7 will now be completed as follows. Conditioning is done on the event $\epsilon_{HH}$ that HH succeeds, i.e., satisfies the three conditions of Definition 4. Given this, conditioning is done on the event $\epsilon_F$ that F succeeds as defined by Theorem 3, i.e., that $\Phi = \|x_{head}\|_1 \pm \epsilon \|x\|_1$.

Next, the quantity $$X = \frac{R}{|I|} \cdot \sum_{j \in I} \tilde{L}_1(j)$$

is looked at.

By Lemma 7, E[X], even conditioned on the randomness used by HH to determined L, is $(1\pm O(\epsilon))\|x_{tail}\|_1$. Also conditioned on $\epsilon_{HH}$, the expected value of Var[X] for a random h is $O(\epsilon^2 \|x\|_1^2)$. Since Var[X] is always non-negative, Markov's bound applies and Var[X]=$O(\epsilon^2 \|x\|_1^2)$ with probability at least $19/20$ (over the randomness in selecting h).

$$Pr_{A,h}[|X - E[X]| > t\varepsilon\|x\|_1 \mid \varepsilon_{HH}] < \frac{1}{20} + O(1/t^2), \quad (EQ. 6)$$

which can be made at most $1/15$ by setting t a sufficiently large constant. Call the event in EQ. 6 $\mathcal{F}$. Then, as long as $\epsilon_{HH}$, $\epsilon_F$, $\mathcal{F}$ occur, the final estimate of $\|x\|_1$ is $(1\pm O(\epsilon))\|x_{tail}\|_1 + \|x_{head}\|_1 \pm O(\epsilon\|x\|_1) = (1\pm O\epsilon\|x\|_1)$ as desired. The probability of correctness is then at least that shown in FIG. 14.

Remark 9: It is known from previous work, that each $A_i[j]$ can be maintained up to only $O(\log(n/\epsilon))$ bits of precision, and requires the same amount of randomness to generate, to preserve the probability of correctness to within an arbitrarily small constant. Then, note that the counters $B_i[j]$ each only consume $O(\log(nmM/\epsilon))$ bits of storage.

Given Remark 9, the following theorem is given.

Theorem 10: Ignoring the space to store the $A_i[j]$, the overall space required for the algorithm of FIG. 7 is $O((\epsilon^{-2}\log(nmM/\epsilon)+\log \log(n))\log(1/\epsilon)+\text{HHSpace}(\epsilon^2))$. The update time and reporting times are, respectively, $O(\log(1/\epsilon))+\text{HHUpdate}(\epsilon^2)$, and $O(\epsilon^{-2}\log(1/\epsilon)+\text{HHReport}(\epsilon^2))$.

PROOF: Ignoring F and HH, the update time is O(1) to compute h, and O(1) to update the corresponding $B_{h(i)}$. Also ignoring F and HH, the space required is $O(\epsilon^{-2}\log(nmM/\epsilon))$ to store all the $B_i[j]$ (Remark 9), and $O(\epsilon^{-2}\log(1/\epsilon)+\log \log (n))$ bits to store h and randomly select the hash family it comes from (Theorem 1). The time to compute the final line in the estimator, given L and ignoring the time to compute $\Phi$, is $O(1/\epsilon)$. The bounds stated above then take into account the complexities of F and HH.

Derandomizing the Final Algorithm

Observe that a naive implementation of storing the entire tuple A in FIG. 7 requires $\Omega(n\log(n/\epsilon))$ bits. Considering that one goal is to have a small-space algorithm, this is clearly not affordable. As it turns out, using a now standard technique in streaming algorithms, one can avoid storing the tuple A explicitly. This is accomplished by generating A from a short, truly random seed which is then stretched out by a pseudorandom generator against space-bounded computation. In Indyk's original argument, he used Nisan's PRG to show that his entire algorithm was fooled by using the PRG to stretch a short seed of length $O(\epsilon^{-2} \log(n/\epsilon) \log(nmM/\epsilon))$ to generate $\Theta(n/\epsilon^2)$ Cauchy random variables. However, for fooling this algorithm, this derandomization step used $\Omega(1/\epsilon^2)$ time during each stream update to generate the necessary Cauchy random variables from the seed. Given that another goal of one or more embodiments is to have fast update time, this is not desired. Therefore, to derandomize the final algorithm discussed above, Nisan's PRG can be applied in such a way that the time to apply the PRG to the seed to retrieve any $A_i[j]$ is small.

First, recall the definition of a finite state machine (FSM). An FSM M is parameterized by a tuple $(T_{init}, S, \Gamma, n)$. The FSM M is always in some "state", which is just a string $x \in \{0,1\}^S$, and it starts in the state $T_{init}$. The parameter $\Gamma$ is a function mapping $\{0,1\}^S \times \{0,1\}^n \to \{0,1\}^S$. Notation is abused and for $x \in (\{0,1\}^n)^r$ for r a positive integer, $\Gamma(T, x)$ is used to denote $\Gamma(\ldots(\Gamma(\Gamma(T, x_1), x_2), \ldots), x_r)$. Note that given a distribution D over $(\{0,1\}^n)^r$, there is an implied distribution M(D) over $\{0,1\}^S$ obtained as $\Gamma(T_{init}, D)$.

DEFINITION 11: Let t be a positive integer. For D, D' two distributions on $\{0,1\}^t$, the total variation distance $\Delta(D, D')$ is defined by $$\Delta(D, D') = \max_{T \subset \{0,1\}^t} |Pr_{X \leftarrow D}[X \in T] - Pr_{Y \leftarrow D'}[Y \in T]|.$$

THEOREM 12. Let $U^t$ denote the uniform distribution on $\{0,1\}^t$. For any positive integers r, n, and for some $S = \Theta(n)$, there exists a function $G_{nisan} := \{0,1\}^s \to (\{0,1\}^n)^r$ with $s = O(S \log(r))$ such that for any FSM $M = (T_{init}, S, T, n)$, $\Delta(M((U^n)^r), M(G_{nisan}(U^S))) \leq 2^{-S}$.

Furthermore, for any $x \in \{0,1\}^s$ and $i \in [r]$, computing the n-bit block $G_{nisan}(x)i$ requires $O(S \log(r))$ space and $O(\log(r))$ arithmetic operations on $O(S)$-bit words.

Before finally describing how Theorem 12 fits into a derandomization of FIG. 7, the following standard lemma is stated.

LEMMA 13: If $X_1, \ldots, X_m$ are independent and $Y_1, \ldots, Y_m$ are independent, then $$\Delta(X_1 x \ldots x X_m, Y_1 x \ldots x Y_m) \leq \sum_{i=1}^{m} \Delta(X_i, Y_i).$$

Now, the derandomization of FIG. 7 is as follows. Condition on all the randomness in FIG. 7 except for A. Recall that $R = \Theta(1/\epsilon^2)$ "buckets" $B_u$. Each bucket contains three counters, which is a sum of at most n Cauchy random variables, each weighted by at most mM. Given the precision required to store A (Remark 9), the three counters in $B_u$ in total consume $S' = O(\log(nmM/\epsilon))$ bits of space. Consider the FSM $M_u$ which has $2^S$ states for $S = S' + \log(n)$, representing the state of the three counters together with an index $i_{cur} \in [n]$ that starts at 0. Define t as the number of uniform random bits required to generate each $A_i[j]$, so that $t = O(\log(nmM/\epsilon))$ by Remark 9. Note $t = \Theta(S)$. Consider the transition function $\Gamma : \{0,1\}^{3t} \to \{0,1\}^S$ defined as follows: upon being fed $(A_i[1], A_i[2], A_i[3])$ (or more precisely, the 3t uniform random bits used to generate this tuple), increment $i_{cur}$ then add $A_i[j] \cdot x_i$ to each $B_u[j]$, for i being the $(i_{cur})$th index $i \in [n]$ such that $h(i) = u$. Now, note that if one feeds the $(A_i[1], A_i[2], A_i[3])$ for which $h(i) = u$ to $M_u$, sorted by i, then the state of $M_u$ corresponds exactly to the state of bucket $B_u$ in the algorithm.

By Theorem 12, if rather than defining A by 3tr truly random bits (for r = n) it is defined instead by stretching a seed of length $s = O(S \log(n)) = O(\log(nmM/\epsilon)\log(n))$ via $G_{nisan}$, then the distribution on the state of $B_u$ at the end of the stream changes by at most a total variation distance of $2^{-S}$. Now, suppose R independent seeds are used to generate different A vectors in each of the R buckets. Note that since each index $i \in [n]$ is hashed to exactly one bucket, the $A_i[j]$ across each bucket need not be consistent to preserve the behavior of our algorithm. Then for $U^t$ being the uniform distribution on $\{0,1\}^t$, $$\Delta(M_1(U^{3t})^r \times \ldots \times M_R(U^{3t})^r, M_1(G_{nisan}(U^S)) \times \ldots \times M_R(U^S))) \leq R \cdot 2^{-S}$$

by Lemma 13.

By increasing S by a constant factor, $R \cdot 2^{-S}$ can be ensured to be an arbitrarily small constant $\delta$. Now, note that the product measure on the output distributions of the $M_u$ corresponds exactly to the state of the entire algorithm at the end of the stream. Thus, if one considers T to be the set of states $(B_1, \ldots, B_R)$ for which the algorithm outputs a value $(1 \pm \epsilon)\|x\|_1$ (i.e., is correct), by definition of total variation distance (Definition 11), the probability of correctness of the algorithm changes by at most an additive $\delta$ when using Nisan's PRG instead of uniform randomness. Noting that storing R independent seeds just takes $R_s$ space, and that the time required to extract any $A_i[j]$ from a seed requires $O(\log(n))$ time by Theorem 12, then there is the following theorem.

THEOREM 14: Including the space and time complexities of storing and accessing the $A_i[j]$, the algorithm of FIG. 7 can be implemented with an additive $O(\epsilon^{-2} \log(nmM/\epsilon) \log(n))$ increase to the space, additive $O(\log(n))$ increase to the update time, and no change to the reporting time, compared with the bounds given in Theorem 10.

Therefore, as can be seen from the above discussion, one or more embodiments provide 1-pass algorithm using $\epsilon^{-2}$ polylog(nmM)space for $l_1$-estimation in data streams with polylog(nmM) update time, and reporting time $\epsilon^{-2}$ polylog(nmM). This algorithm is the first to be simultaneously optimal in both the space and the update time up to polylog (nmM) factors. Conventional algorithms either required at least $\epsilon^{-3}$ polylog(nmM)bits of space, or at least $\epsilon^{-2}$ update time. As $\epsilon$ can be arbitrarily small, the result of one or more embodiments can provide a substantial benefit over conventional algorithms. In light of known lower bounds, the space and time complexity of these one or more embodiments are optimal up to polylog(nmM) factors.

Operational Flow

FIG. 15 is an operational flow diagram illustrating one example of measuring the distance between two or more vectors. The operational flow diagram of FIG. 15 begins at step 1502 and flows directly to step 1504. The data stream analyzer 110, at step 1504, analyzes at least two vectors of n coordinates. The data stream analyzer 110, at step 1506, identifies a set of heavy coordinates from the set of n coordinates associated with the at least two vectors. The data stream analyzer 110, at step 1508, identifies a set of light coordinates from the set of n coordinates. The data stream analyzer 110, at step 1510, determines a first estimate of a contribution from the set of heavy coordinates to the $l_1$ distance between the at least two vectors. The data stream analyzer 110, at step 1512, determines a second estimate of a contribution from the set of light coordinates to the $l_1$ distance between the at least two vectors. The data stream analyzer 110, at step 1514, sums the first estimate and the second estimate. The control flow then exits at step 1516.

Non-Limiting Examples

Aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system. Also, aspects of the present invention have been discussed above with reference to flowchart illustrations and/or block diagrams of methods, apparatus (systems) and computer program products according to embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method for determining a distance between at least two vectors of n coordinates, the method comprising:

identifying a set of heavy coordinates from a set of n coordinates associated with at least two vectors as a set of heavy coordinates, wherein a heavy coordinate is represented as $|x_i| \geq \epsilon^2 \|x\|_1$, where x is a vector, i is a coordinate in the set of n coordinates, and $\epsilon$ is an arbitrary number;

identifying a set of light coordinates from the set of n coordinates associated with the at least two vectors, as a set of light coordinates, wherein a light coordinate is represented as $|x_i| < \epsilon^2 \|x\|_1$;

determining a first estimation of a contribution from the set of heavy coordinates to a rectilinear distance between the at least two vectors; wherein determining the first estimation comprises multiplying each of a set of stream updates by a subset of a set of constructed hash functions, wherein the subset is defined based on $\epsilon^2$;

determining a second estimation of a contribution from the set of light coordinates to the rectilinear distance, wherein determining the second estimation comprises multiplying each of a set of stream updates by a subset of the set of constructed hash functions, wherein the subset is defined based on $\epsilon^2$, and wherein the second estimation is determined separate from the first estimation; and combining the first estimation with the second estimation.

2. The method of claim 1, wherein determining the first estimation comprises:

maintaining a first data structure by:
selecting a random sign vector $\sigma \in \{-1,1\}^n$ from a 4-wise independent family;
setting $r=\lceil 27/\epsilon^2 \rceil$;
select a hash function h: $[n] \to [r]$ from a family $\mathcal{H}$ constructed randomly; and
initializing r counters $b_1, \ldots, b_r$;
receiving an update in the form of (i, v), where v is a change to i; and
adding $\sigma(i) \cdot v$ to $b_{h(i)}$.

3. The method of claim 2, wherein determining the first estimation further comprises:

maintaining a second data structure by:
initializing $s=\lceil \log 3(1/\epsilon^2) \rceil+3$ independent copies of the first data structure;
given the update (i, v) adding $\sigma(i) \cdot v$ to $b_{h(i)}$ to each of the three copies of the first data structure.

4. The method of claim 2, wherein a space complexity of the second data structure is $O(\epsilon^{-2} \log(1/\epsilon)\log(mM)+\log(1/\epsilon)$ log log n), where O is where O represents a constant C that is independent of n, m is a number of updates from a set $[n] \times \{-M, \ldots, M\}$, and where an update time of the second data structure is $O(\log(1/\epsilon))$.

5. The method of claim 3, wherein the first estimation is equal to $$\Phi = \sum_{w \in L} \text{sign}(x_w) \cdot \sigma^{i(w)}(w) \cdot D_{i(w),j(w)},$$

where $\Phi$ is the first estimation, $\sigma$ a random vector with each of its entries being either +1 or −1, D is a count, w is an arbitrary variable, and j is an arbitrary variable.

6. The method of claim 3, wherein determining the second estimation comprises:

maintaining $R=\Theta(1/\epsilon^2)$ buckets $B_i$ in parallel with the second data structure;
mapping each i in [n] to exactly one bucket i $\epsilon$ [R], wherein the ith bucket keeps track of a dot product of x, restricted to those indices hashed to i, with three random Cauchy vectors;
calculating a geometric mean of each bucket corresponding to the set of light coordinates; and
summing the geometric mean calculating each bucket.

7. The method of claim 6, wherein the heavy coordinates are identified using a CountMin sketch algorithm, and wherein the set of light coordinates are identified as a set of buckers from the $R=\Theta(1/\epsilon^2)$ buckets failing to comprise any heavy coordinates.

* * * * *